United States Patent [19]

Fon Toy et al.

[11] 3,742,040
[45] June 26, 1973

[54] ALKYLAMMONIUM ALKYLPHOSPHONAMIDATES

[75] Inventors: Arthur Dock Fon Toy, Stamford, Conn.; Kenneth H. Rattenbury, Morgantown, W. Va.

[73] Assignee: Stauffer Chemical Company, New York, N.Y.

[22] Filed: July 28, 1969

[21] Appl. No.: 870,797

Related U.S. Application Data

[62] Division of Ser. No. 592,328, Nov. 7, 1966, abandoned.

[52] U.S. Cl...... 260/501.21, 260/465 E, 260/551 P, 424/199
[51] Int. Cl. ............................ A01n 9/36, C07f 9/44
[58] Field of Search ................ 260/501.21, 502.4 R, 260/502.4 P

[56] References Cited
UNITED STATES PATENTS

| | | | |
|---|---|---|---|
| 2,670,369 | 2/1954 | Filatoff-Rocq et al. | 260/953 |
| 3,112,267 | 11/1963 | Price et al. | 260/501.21 X |
| 3,363,032 | 1/1968 | Fitch | 260/501.21 X |

OTHER PUBLICATIONS

Kennard et al., JACS, Vol. 77, pages 1156–1159 (1955).

*Primary Examiner*—Lewis Gotts
*Assistant Examiner*—Richard L. Raymond
*Attorney*—Robert C. Sullivan, Wayne C. Jaeschke and Donald M. MacKay

[57] ABSTRACT

An organic phosphorus composition comprising:
a. a major portion of an alkylammonium alkylphosphonoamidate of the formula:

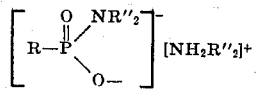

wherein R is a halo substituted alkyl of from one to eight carbon atoms inclusive, or a radical of the formula:

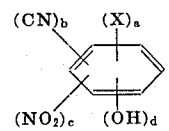

wherein X is a halogen, $a$, $b$, $c$, and $d$, are integers of from 0 to 5 inclusive such that the sum $a+b+c+d$ is from 0 to 5, and R'' is an alkyl group containing from 12 to 18 carbon atoms; and
b. a minor amount of by-products having the formulae:

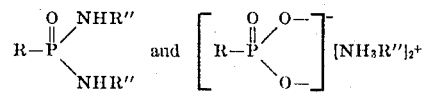

wherein R and R'' are as defined above, is produced by reacting a phosphonic anhydride with a long chain alkyl amine. These compounds, exemplified by laurylammonium, N-lauryl chloromethylphosphonoamidate, have utility as fungicides and bactericides.

7 Claims, No Drawings

ALKYLAMMONIUM ALKYLPHOSPHONAMIDATES

This is a division of application Ser. No. 592,328, filed November 7, 1966, now abandoned.

This invention relates to a group of novel organic phosphorus and nitrogen-containing compounds and more particularly to a group of compounds of the general formula:

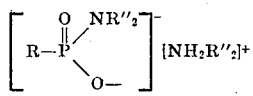

wherein R is a halo substituted alkyl of from 1 to 8 carbon atoms inclusive, or a radical of the formula:

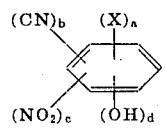

wherein X is a halogen, preferably chlorine, and $a$, $b$, $c$, and $d$ represent integers of from 0 to 5 inclusive, the sum of which is never greater than five, R' is a hydroxyl or N—R''$_2$ group, and R'' is an alkyl group containing from 12 to 18 carbon atoms inclusive, or hydrogen with the proviso that only one R'' can be hydrogen.

The compounds may be prepared by reacting a phosphonic acid or phosphonic anhydride with a long chain alkyl amine in accordance with the following reaction diagrams wherein R and R'' are as previously defined and n is an integer greater than 2.

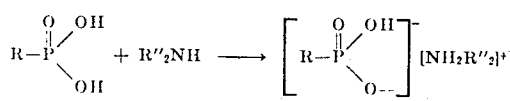

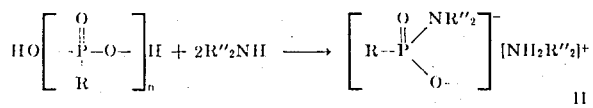

The products of the type represented by reaction diagram I can be prepared by contacting the phosphonic acid and desired amine in a reaction zone having a temperature between about 0° and 100° C. The reaction can be conducted in a suitable inert solvent if desired. Illustrative of suitable inert solvents are toluene and carbon tetrachloride. Recovery of the resultant salt is accomplished by partial evaporation of the solvent and filtration.

Products of the type represented by reaction diagram II are more difficult to prepare and therefore the remaining discussion is directed to them. These products can be prepared by slowly combining the phosphonic acid anhydride and the desired amine at a temperature between about 0° and 150° C., and preferably between about 50° C. and 120° C. The reaction is exothermic until the P-N bond is formed, but the reaction may be easily controlled by external cooling and vigorous agitation.

The phosphonic anhydride, a solid at room temperature, is preferably added in the liquid state to the amine in order to permit lower reaction temperatures. This can be accomplished by heating the anhydride to a temperature between about 50° C. and 150° C. After the P-N bond is formed, the remainder of the reactants can be rapidly combined without the need for external cooling.

After the reactants have been combined, it is preferred to maintain the temperature of the reaction mixture between about 80° C. and 150° C. for 1 – 2 hours, while agitating the mixture to insure completion of the reaction.

In order to inhibit reaction of the halogen-substituted alkyl group of the phosphonic anhydride with the alkyl amine reactant, it is preferred to conduct the reaction stepwise. This can be accomplished by reacting one mole of amine per mole of phosphonic anhydride at a temperature between about 50° C. and 150° C. and thereafter reacting the resultant compound with another mole of amine at a temperature between about 0° and 100° C. in the presence of an inert organic solvent.

Although the product is principally the alkylammonium alkylphosphonamidate depicted in reaction II, minor amounts of the following by-products are also produced:

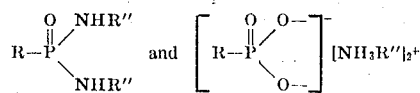

wherein R is as previously defined, a

radical or R''NH(CH$_2$)$_n$ radical wherein $n$ is an integer of from 1 to 8 inclusive; and R'' is as previously defined. The compounds are not easily separated by conventional means such as crystallization or fractionation. The impure product mixture, however, has excellent pesticidal properties and consequently separation of the reaction components is not required or in fact for most uses ordinarily desirable.

If desired, the alkyl groups in the salt and amide portion of the molecule can be the same or different. When different the compounds are prepared by reacting one mole of the appropriate phosphonic anhydride with one mole of amine, and thereafter reacting the reaction product with one mole of a different amine.

Representative compounds within the ambit of this invention include the following:

Compound 1

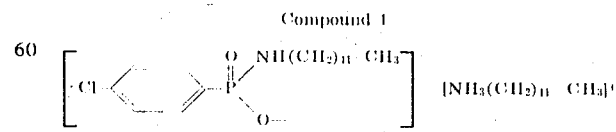

Compound 2

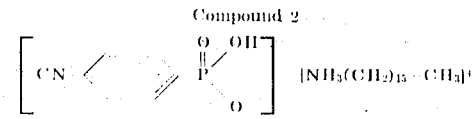

Compound 3

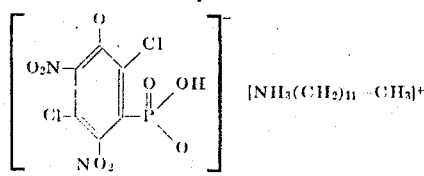

Compound 4

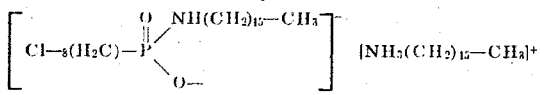

The following examples serve to illustrate the invention.

EXAMPLE 1

Preparation of laurylammonium N-lauryl chloromethylphosphonamidate

To a three-necked 500 cubic centimeter flask fitted with a separatory funnel, stirrer and thermometer, is added 119.4 grams (1.06 moles) of solid chloromethylphosphonic anhydride. The solid is heated until in the molten state at a temperature of about 150° C. and 363.0 grams (2.13 moles) of freshly distilled lauryl amine is added to the melt. The reaction mixture is vigorously stirred and external cooling is applied during the addition, so that the temperature of the reaction mixture is maintained between about 110° C. and 120° C. After the amine addition is complete, which is 40 minutes, the resultant viscous mass is maintained at a temperature between 80° C. and 90° C. for approximately two hours. The mixture is then allowed to cool to room temperature and the product is recovered directly.

EXAMPLE 2

Preparation of laurylammonium chloromethylphosphonate

To a three-necked 500 cubic centimeter flask fitted with a stirrer and thermometer and containing 39.2 grams (0.3 mole) of chloromethylphosphonic acid dissolved in 100 milliliters of isopropanol is added 55.5 grams (0.3 mole) of lauryl amine dissolved in 100 milliliters of isopropanol. The reaction is conducted at room temperature. After the addition is complete, the resultant salt is recovered by partial evaporation of the solvent and filtration. The product is laurylammonium chloromethylphosphonate.

EXAMPLE 3

Preparation of laurylammonium N-lauryl phenylphosphonamidate

To a 500 cubic centimeter three-necked reaction flask fitted with a stirrer, thermometer and separatory funnel is added 37 grams (0.2 mole) of distilled lauryl amine. By way of the separatory funnel is added 14 grams (0.1 mole) of phenylphosphonic acid anhydride while maintaining the temperature of the reaction mixture below 56° C. The mixture is then maintained within a temperature range of 90° – 100° C. for approximately 1½ hours, during which time agitation of the mixture is continued. The mixture is then allowed to cool to room temperature, whereupon the mixture solidifies into a semi-solid and the product is recovered directly.

EXAMPLE 4

Preparation of stearylammonium N-stearyl phenylphosphonamidate

To a 500 cubic centimeter three-necked reaction flask fitted with a stirrer, thermometer and separatory funnel is added 113 grams (0.42 mole) of stearyl amine. The amine is maintained within a temperature range of 70° – 80° C. and 163 grams (0.78 mole) of phenyl phosphonic anhydride is added. After the addition is complete, the mixture is heated to a temperature of 100° C. at which point a red transparent liquid is observed. The mixture is then allowed to cool to room temperature, whereupon the mixture solidifies into a semi-solid material and the product is recovered directly.

EXAMPLE 5

Preparation of laurylammonium N-lauryl chloromethylphosphonamidate

To a three-necked 500 cubic centimeter flask fitted with a separatory funnel, stirrer and thermometer is added 119.4 grams (1.06 moles) of chloromethylphosphonic anhydride. The solid is heated until in the molten state at a temperature of about 150° C., and 182.5 grams (1.06 moles) of freshly distilled lauryl amine is added to this melt. The reaction mixture is vigorously stirred and external cooling is applied during the addition, so that the temperature of the reaction mixture is maintained between about 110° C. and 120° C. After the amine addition and the subsidence of the subsequent exothermic reaction is complete, an additional equivalent of amine, dissolved in 100 milliliters of toluene, is added. The reaction is conducted at room temperature and the resultant viscous material is recovered directly.

The compounds of the invention are useful as pesticides and exhibit, for example, fungicidal and bactericidal activity.

To test for protectant action of one of the invention compounds against fungi attacking plant foliage, 8 pinto bean plants are thoroughly sprayed with a concentration of dissolved or suspended compound in water. The plants are allowed to dry and are then inoculated with rust spores. Three to four weeks after treatment, the plants are observed and compared with untreated plants which have been infested with rust spores. The product of Example 1 is found to give complete control against rust fungi at the 0.1 percent concentration.

The compounds of the invention are also effective systemic fungicides. In testing for systemic fungicidal activity, 60 milliliters of the compound to be tested is diluted to 50 parts per million in distilled water and poured into each of four test tubes. A pinto bean plant is placed in each tube with a cotton plug that provides stem support as well as helps prevent evaporation. 48 hours later, the plants are inoculated with rust spores. Comparison between the treated and untreated plants is then made at periodic intervals and the results evaluated. The product of Example 1 is found to give complete control at a 0.005 percent concentration.

Bacteriostatic and fungicidal activity of the invention compounds in vitro is determined by the following test. The active compound, dissolved in distilled water at a concentration of 0.005 percent, is placed in a one ounce bottle partially filled with 10 milliliters of malt or nutrient broth. The containers are then capped with aluminum foil, sterilized, and a solution of the compound to be tested injected by means of a syringe through the foil into the broth. Water suspensions of such typical fungi as Aspergillus niger, Penicillium sp, and bacteria such as Escherichia coli are injected into the broth and the bottles sealed and held for 1 week, after which time the growth is recorded. The product of Example 1 is found to give complete control at the 0.005 percent concentration.

In addition to the methods hereinbefore described, the compounds of the invention may be used to control microorganisms by a variety of procedures which are known to the art. For example, a solution of the compound in an organic solvent may be applied directly to the soil in the form of a spray. Alternatively dispersions of the compounds in a water media may be advantageously employed. In the latter case, the use of various surface-active agents or soaps may be desirable. The surface-active agents may be of the anionic, cationic or non-ionic types to include the sulfonated animal and vegetable oils, sulfonated petroleum oils, sodium lauryl sulfonate, ethylene oxide condensation products of the type produced by reacting octyl phenol with ethylene oxide and higher alkyl pyridinium halides as exemplified by lauryl pyridinium bromide. In general, highly satisfactory results are obtained when the surface-active agent constitutes between about 1 – 15 percent of the composition.

It is noteworthy that the compounds are non-toxic to mammals, a property which permits highly diversified use without danger of damage to livestock. Mammalian toxicity is determined by using albino mice, and the results are reported in milligrams of toxicant per kilogram of body weight required to produce 50 percent mortality, when administered by intraperitoneal injection. The product of Example 1 is found to have a MT–50 of 390 mg/kg.

We claim:

1. An organic phosphorus composition consisting essentially of:
   a. a major portion of an alkylammonium alkylphosphonamidate of the formula:

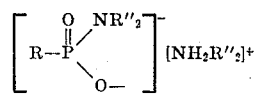

wherein R is a halo substituted alkyl of from one to eight carbon atoms inclusive, or a radical of the formula:

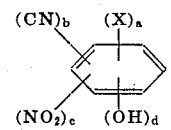

wherein X is a halogen, $a, b, c$ and $d$ are integers of from 0 to 5 inclusive such that the sum $a+b+c+d$ is from 0 to 5, and R'' is an alkyl group containing from 12 to 18 carbon atoms or hydrogen with the proviso that only one R'' can be hydrogen; and b. a minor amount of by-products having the formulae:

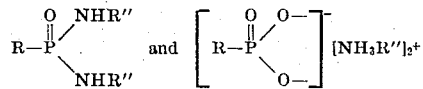

wherein R and R'' are as defined above.

2. The composition of claim 1 wherein R'' is a lauryl group.

3. The composition of claim 1 wherein R'' is a stearyl group.

4. The composition of claim 1 wherein R is a chloromethyl group.

5. The composition of claim 1 wherein R is a phenyl group.

6. The composition of claim 2 wherein R is a chloromethyl group.

7. The composition of claim 3 wherein R is a chloromethyl group.

* * * * *